Dec. 10, 1929.                 C. E. WHITE                  1,738,547
                           DIE FOR FORMING WASHERS
                              Filed July 5, 1924

INVENTOR
CLAUDE E. WHITE.
BY
ATTORNEY

Patented Dec. 10, 1929

1,738,547

UNITED STATES PATENT OFFICE

CLAUDE E. WHITE, OF OAKLAND, CALIFORNIA, ASSIGNOR, BY MESNE ASSIGNMENTS, TO GAT GUN LUBRICATING CORPORATION, OF OAKLAND, CALIFORNIA, A CORPORATION OF CALIFORNIA

DIE FOR FORMING WASHERS

Application filed July 5, 1924. Serial No. 724,299.

My invention is an improved die for forming washers.

With my die washers may be rapidly and inexpensively formed with a minimum amount of labor.

An object of my invention is to provide a die for forming a cut in the face of a washer part way through so that the washer may be expanded or formed at the cut portion, and thus form a U-shaped washer. By this method I can use heavy material such as sole leather which will, when made flexible by proper treatments, spread into the desired shape. By my invention I cut into the fibers of the material from which the washers are made. The die illustrated is constructed so as to form both the outside periphery, the inside face and by an extra blade cut into the washer in an axial direction. Thus the washer is shaped and simultaneously cut in the same operation.

My washers are particularly useful in packing the joints of high pressure hoses, grease guns, pumps, etc.

The washers cut by my die are characterized by the cut from one face extending in an axial direction. This cut may be expanded to shape the washer. The finished washer is suitable for practically any purpose required of a U-shaped washer, and may be applied in a flexible joint as shown in application of Walter F. Hundemer, Serial No. 682,933, filed December 27, 1923; and the washer may be shaped by the forming washers shown in application of the said Hundemer Serial No. 727,342, filed July 21, 1924, for High pressure grease conduit. In my washer the fibers are cut into in contra-distinction to molded washers in which the fibers undergo a sharp bend.

In the annexed drawing in which my method is illustrated:

Figure 1:
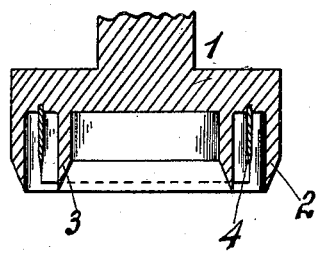
Figure 1 is a transverse sectional view of the forming die.
Figure 2:
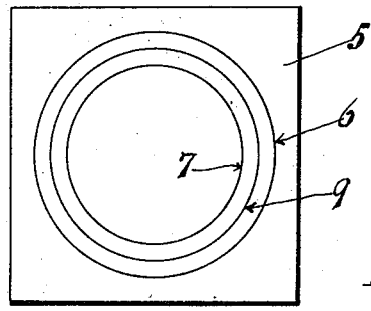
Figure 2 is a plan view of a block with a washer cut therefrom.

Referring more particularly to the drawing. 1 indicates my die generally. The die is formed with an outer cutting edge 2 and an inner cutting edge 3 spaced from the edge 2 by the thickness of the washer to be formed.

A substantially thin cutting blade 4 is mounted between the edges 2 and 3, and is adapted to cut an annular groove in the washer. The lower edge of this blade is set slightly above the lower cutting surface of the edges 2 and 3, which thus cuts a groove only part way through the washer.

Figure 3:
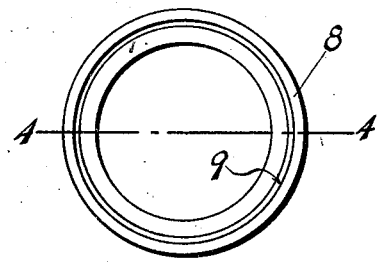
Figure 3 is a plan view of my washer.
Figure 4:
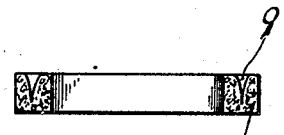
Figure 4 is a sectional view taken on the line 4—4 of Fig. 3.

The washers are formed from a heavy block of material 5, such as leather. The die 1 cuts completely through this block as at 6 and 7 to form the ring 8, and simultaneously the blade 4 cuts the groove 9 to form the completed washer, as shown in Figs. 3 and 4.

It will be understood that various shaped washers can be made with the die of my invention; for instance, they may be made of shapes other than circular and may be partly cut through at one portion and left uncut at another to suit various circumstances of use. The cuts may also vary in depth.

Having described my invention, I claim:

A die for making washers comprising three concentric circular blades, the edges of two of said blades being in the same plane, the edge of the intermediate one of said blades being in a plane below the plane of the edges of the other two blades.

In testimony whereof I affix my signature.

CLAUDE E. WHITE.